United States Patent
Ottur et al.

(10) Patent No.: US 9,769,237 B2
(45) Date of Patent: Sep. 19, 2017

(54) METHOD AND APPARATUS FOR TESTING IN A COMMUNICATION NETWORK

(75) Inventors: Deepak Ottur, Hillsborough, NJ (US); John Riley, Topsfield, MA (US); Louis Mamakos, Lawrenceville, NJ (US); Steven Douglas Miller, Potomac, MD (US)

(73) Assignee: Vonage America Inc., Holmdel, NJ (US)

(*) Notice: Subject to any disclaimer, the term of this patent is extended or adjusted under 35 U.S.C. 154(b) by 1818 days.

(21) Appl. No.: 12/107,813

(22) Filed: Apr. 23, 2008

(65) Prior Publication Data
US 2009/0268713 A1    Oct. 29, 2009

(51) Int. Cl.
*H04L 12/66* (2006.01)
*H04L 29/06* (2006.01)
*H04L 12/26* (2006.01)
*H04M 7/00* (2006.01)

(52) U.S. Cl.
CPC .............. *H04L 65/80* (2013.01); *H04L 43/00* (2013.01); *H04L 43/50* (2013.01); *H04M 7/0069* (2013.01); *H04M 7/0084* (2013.01); *H04L 43/087* (2013.01); *H04L 43/0829* (2013.01); *H04L 43/0852* (2013.01); *H04L 43/0864* (2013.01)

(58) Field of Classification Search
CPC .................................................... H04L 12/66
USPC .......... 455/90, 436, 423; 370/242, 352, 331, 370/230, 254, 241; 709/224, 223; 705/2; 379/201.01, 93.05; 704/270; 719/317; 398/45; 381/58
See application file for complete search history.

(56) References Cited

U.S. PATENT DOCUMENTS

| 5,402,474 | A  | * | 3/1995 | Miller et al. ............... 379/93.12 |
| 5,490,204 | A  | * | 2/1996 | Gulledge ...................... 455/423 |
| 6,088,588 | A  | * | 7/2000 | Osborne ....................... 455/425 |
| 6,445,681 | B1 |   | 9/2002 | Pogrebinsky |

(Continued)

FOREIGN PATENT DOCUMENTS

| KR | 10-2004-0056982 A |   | 1/2004 |           |
| KR | 2007059863 A      | * | 6/2007 | H04L 12/26 |

(Continued)

OTHER PUBLICATIONS

International Search Report and Written Opinion mailed Nov. 27, 2009 for Application No. PCT/US2009/041407.

(Continued)

*Primary Examiner* — Parth Patel
(74) *Attorney, Agent, or Firm* — Moser Taboada; Joseph Pagnotta

(57) ABSTRACT

Method and apparatus for testing in a communication network is described. One example of the invention relates to a method of testing in a voice over internet protocol (VOIP) network. At least one test script is obtained from the VOIP network at an enhanced terminal adapter. The enhanced terminal adapter is configured to couple at least one communication device to the VOIP network. The at least one test script is executed within a scripting framework of the enhanced terminal adapter to interact with at least one component coupled to the VOIP network. Results of the execution of the at least one test script are transmitted from the enhanced terminal adapter to the VOIP network.

18 Claims, 5 Drawing Sheets

(56) References Cited

U.S. PATENT DOCUMENTS

| | | | |
|---|---|---|---|
| 6,721,554 B2 | 4/2004 | Gnesda et al. | |
| 6,847,704 B1* | 1/2005 | Cherchali et al. | 379/93.05 |
| 7,173,910 B2 | 2/2007 | Goodman | |
| 7,340,166 B1* | 3/2008 | Sylvester et al. | 398/45 |
| 7,643,414 B1* | 1/2010 | Minhazuddin | 370/230 |
| 7,707,586 B2* | 4/2010 | Smith et al. | 719/317 |
| 7,961,712 B2* | 6/2011 | Rabenko et al. | 370/352 |
| 2002/0072333 A1 | 6/2002 | Gnesda et al. | |
| 2002/0131604 A1* | 9/2002 | Amine | 381/58 |
| 2002/0137472 A1* | 9/2002 | Quinn et al. | 455/90 |
| 2002/0145979 A1* | 10/2002 | Baj | 370/242 |
| 2002/0167936 A1 | 11/2002 | Goodman | |
| 2002/0167937 A1 | 11/2002 | Goodman | |
| 2003/0093513 A1 | 5/2003 | Hicks et al. | |
| 2003/0128692 A1 | 7/2003 | Mitsumori et al. | |
| 2003/0142629 A1* | 7/2003 | Krishnamurthi et al. | 370/249 |
| 2003/0200303 A1* | 10/2003 | Chong | 709/224 |
| 2004/0085898 A1 | 5/2004 | Gass | |
| 2004/0133453 A1* | 7/2004 | Jomini et al. | 705/2 |
| 2004/0165570 A1 | 8/2004 | Lee | |
| 2005/0025063 A1 | 2/2005 | Grovenburg | |
| 2005/0152339 A1* | 7/2005 | Scott et al. | 370/352 |
| 2005/0271029 A1 | 12/2005 | Iffland | |
| 2006/0031469 A1* | 2/2006 | Clarke et al. | 709/224 |
| 2006/0073786 A1 | 4/2006 | Sarkar | |
| 2006/0104218 A1 | 5/2006 | Kako | |
| 2006/0153174 A1 | 7/2006 | Towns-von Stauber et al. | |
| 2006/0159245 A1* | 7/2006 | Kim et al. | 379/201.01 |
| 2006/0198310 A1 | 9/2006 | Stieglitz et al. | |
| 2006/0203801 A1 | 9/2006 | Li et al. | |
| 2007/0019559 A1* | 1/2007 | Pittelli et al. | 370/248 |
| 2007/0064616 A1 | 3/2007 | Miranda et al. | |
| 2007/0091848 A1* | 4/2007 | Karia et al. | 370/331 |
| 2007/0094374 A1* | 4/2007 | Karia et al. | 709/223 |
| 2007/0168195 A1* | 7/2007 | Wilkin et al. | 704/270 |
| 2007/0207804 A1* | 9/2007 | Sharma et al. | 455/436 |
| 2008/0031153 A1 | 2/2008 | Punreddy et al. | |
| 2008/0049623 A1* | 2/2008 | Qiu et al. | 370/241 |
| 2008/0089242 A1* | 4/2008 | Whitten | 370/254 |
| 2009/0003221 A1* | 1/2009 | Burns et al. | 370/241 |

FOREIGN PATENT DOCUMENTS

| | | | | |
|---|---|---|---|---|
| KR | 792374 B1 * | 1/2008 | | H04L 12/24 |
| WO | WO 0211413 A2 * | 2/2002 | | H04M 7/00 |
| WO | WO 2004/086677 A1 | 10/2004 | | |
| WO | WO-2006/094296 A1 | 9/2006 | | |
| WO | WO 2006094296 A1 * | 9/2006 | | H04Q 7/34 |

OTHER PUBLICATIONS

"RTP Control Protocol Extended Reports (RTCP XR)", Network Working Group, T. Friedman, et al., pp. 1-55.

"RTP: A Transport Protocol for Real-Time Applications", Network Working Group, H. Schulzrinne, et al., pp. 1-93.

European Search Report for Application No. 09735784.2, dated Jul. 30, 2013, 8 pages.

* cited by examiner

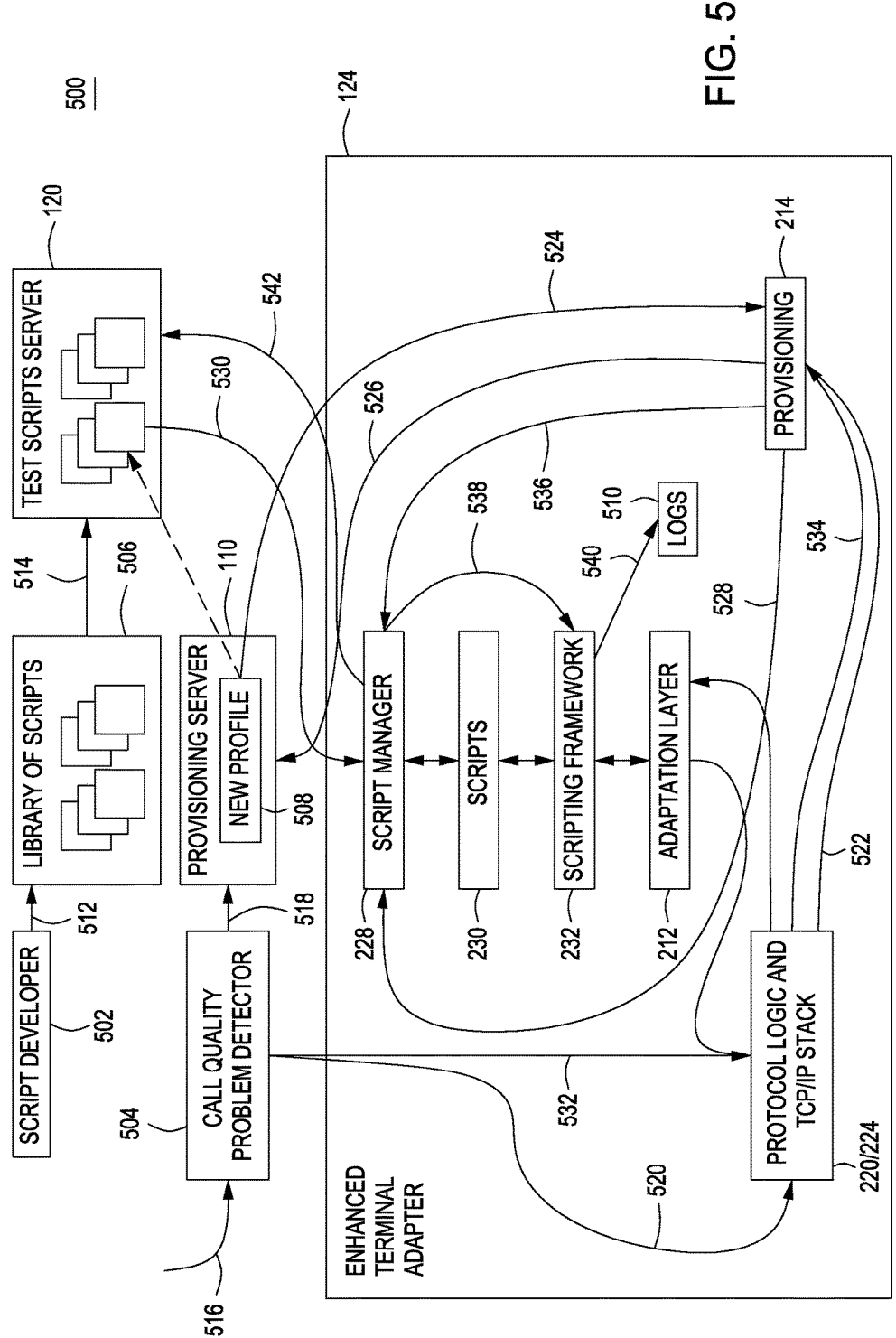

METHOD AND APPARATUS FOR TESTING IN A COMMUNICATION NETWORK

BACKGROUND OF THE INVENTION

Field of the Invention

The present invention relates generally to communication systems and, more particularly, to a method and apparatus for testing in a communication network.

Description of the Related Art

Packet-based networks, in particular, Voice Over Internet Protocol (VOIP) networks, are rapidly emerging as a viable alternative to traditional telephony (i.e., circuit switched networks). To be a truly competitive alternative, VOIP must emulate the performance of traditional telephony and do so using a protocol that was optimized for data traffic. The characteristics of data traffic, however, are quite different from those of voice traffic. For example, unlike data traffic, voice traffic is extremely intolerant of delay and delay variation (or "jitter"), as well as packet loss. Thus, VOIP providers desire mechanisms for monitoring and testing quality of calls established through the network ("call quality"). Moreover, when a customer reports a call quality problem, VOIP providers desire mechanisms for diagnosing the call quality problem.

One approach to address a call quality problem is to employ a customer side probe (CSP). When a call quality problem arises, the VOIP provider sends a CSP to the customer's location, where the customer connects the CSP to their network. The CSP can then make calls to a server in the VOIP provider network and attempt to diagnose call quality problems. A CSP, however, is often an expensive device that must be shipped to the customer. The customer must then install the CSP in their home network. Thus, using a CSP involves significant expense and time to diagnose call quality problems.

Accordingly, there exists a need in the art for a method and apparatus for testing in a communication network that overcomes the aforementioned deficiencies.

SUMMARY OF THE INVENTION

Method and apparatus for testing in a communication network is described. One aspect of the invention relates to a method of testing in a voice over internet protocol (VOIP) network. At least one test script is obtained from the VOIP network at an enhanced terminal adapter. The enhanced terminal adapter is configured to couple at least one communication device to the VOIP network. The at least one test script is executed within a scripting framework of the enhanced terminal adapter to interact with at least one component coupled to the VOIP network. Results of the execution of the at least one test script are transmitted from the enhanced terminal adapter to the VOIP network.

Another aspect of the invention relates to an enhanced terminal adapter for coupling at least one communication device to VOIP network. A terminal adapter and routing logic are configured to make and receive VOIP calls. A test script manager is configured to obtain at least one test script from the VOIP network. A scripting framework module is configured to execute the at least one test script to interact with at least one component coupled to the VOIP network, and transmit results of the execution of the at least one test script to the VOIP network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 is flow diagram showing exemplary embodiment of a method of operation of the enhanced terminal adapter shown in FIG. 2 in accordance with one or more aspects of the invention.

DETAILED DESCRIPTION

Figure 1:
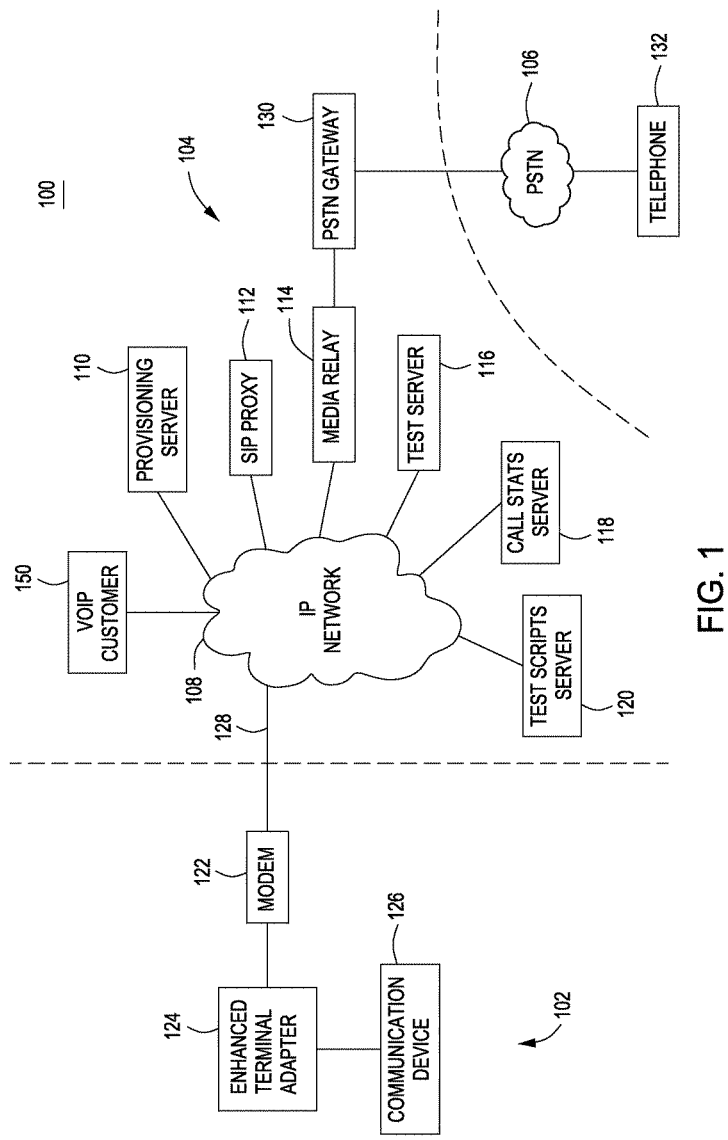
FIG. 1 is a block diagram depicting an exemplary embodiment of a communication system in accordance with one or more aspects of the invention.

FIG. 1 is a block diagram depicting an exemplary embodiment of a communication system 100 in accordance with one or more aspects of the invention. The communication system 100 includes customer premises equipment (CPE) 102, a voice-over-internet-protocol (VOIP) network 104, and a public switched telephone network (PSTN) 106. The VOIP network 104 includes a plurality of servers coupled to an internet protocol (IP) network 108. The servers may include one or more provisioning servers 110, one or more proxy servers 112, one or more media relay servers 114, one or more test servers 116, one or more call statistics server 118, and one or more test scripts server 120. The servers 110-120 may be implemented using a plurality of computer systems and like type general and/or specific purpose devices and systems. For purposes of exposition, each of the servers 110-120 is referred to in the singular (e.g., the provisioning server 110). The media relay server 114 may be coupled to a PSTN gateway 130, which in turn is coupled to the PSTN 106. The PSTN 106 provides conventional telephone service to a plurality of telephones 132.

The CPE 102 may include a modem 122, an enhanced terminal adapter 124, and a communication device 126 (e.g., a telephone, computer, etc.). The communication device 126 is coupled to the enhanced terminal adapter 124, which in turn is coupled to the modem 122. The modem 122 is coupled to the IP network 108 via a link 128 (e.g., a cable, digital subscriber line (DSL), or like type communications link).

In some embodiments, the enhanced terminal adapter 214 includes a terminal adapter, router, and scripting framework integrated together in a single unit. A "terminal adapter" in this context means any IP media endpoint, such as a telephone adapter, an IP soft phone, a wireless local area network (LAN) based VOIP phone, an IP video phone, a wireless LAN based IP video phone, a network based media player (e.g., a set top box), and the like. Accordingly, in some embodiments, the terminal adapter is further coupled to the communications device 126 (e.g., the terminal adapter is a telephone adapter configured to communicate with a plain old telephone system (POTS) telephone). In other embodiments, the terminal adapter includes the functionality of the communication device 126 (e.g., the terminal adapter is an IP soft phone).

The router functionality of the enhanced terminal adapter 214 enables communication between the customer devices (e.g., the communications device 126 and other computers or communications devices) and the IP network 108. The scripting framework functionality provides a script execution environment that can be used for various functions, such as monitoring call quality and testing/diagnosing call quality problems, diagnosing network connectivity problems, diagnosing Internet connectivity problems (e.g., problems connecting to Internet hosts), and the like. An exemplary embodiment of the enhanced terminal adapter 214 is described below with respect to FIG. 2. While the enhanced terminal adapter 214 is described herein as a single unit, those skilled in the art will appreciate that the functionalities included therein (e.g., the terminal adapter, router, and scripting framework) may be divided among one or more physical devices in communication with one another.

The modem 122 provides an interface between the enhanced terminal adapter 214 and the link 128. For example, the modem 122 may be a cable, DSL, or like type broadband modem. Those skilled in the art will appreciate that the functionality of the modem 122 may also be incorporated into the enhanced terminal adapter 214, obviating the need for a separate modem device.

The provisioning server 110 is adapted to configure the CPE 102 for operation with the VOIP network 104. Notably, the provisioning server 110 is adapted to transmit and load a configuration file (also referred to as a profile) to the enhanced terminal adapter 124. The proxy server 112 is configured to forward requests initiated by the CPE 102 to the appropriate server in the VOIP network 104. For example, the proxy server 112 may be a session initiation protocol (SIP) proxy server configured to service SIP requests from the CPE 102. SIP is a well known protocol used in VOIP networks. The media relay server 114 is configured to route VOIP calls. For example, the media relay server 114 can route a call from the CPE 102 to a telephone 132 coupled to the PSTN 106 via the PSTN gateway 130 or to CPE of another customer 150 of the VOIP network 104.

The call statistics server 118 is configured to obtain and maintain various call statistics from the enhanced terminal adapters of CPE serviced by the VOIP network 104 (e.g., the enhanced terminal adapter 124). The call statistics server 118 may generate various metrics, such as a mean opinion score (MOS), jitter, and/or latency for a variety of parameters, such as call quality for individual calls for one enhanced terminal adapter plotted over time, call quality for multiple enhanced terminal adapters connected over a particular network plotted over time, call quality for multiple enhanced terminal adapters in a specific geographic area plotted over time, average call quality for the entire VOIP service or some other subset of the VOIP service plotted over time, and the like. The test scripts server 120 is configured to maintain a library of test scripts that can be executed by an enhanced terminal adapter to assist in diagnosing various VOIP call problems, including call quality problems. The test server 116 is configured to receive test calls from the enhanced terminal adapter 124 and initiate test calls to the enhanced terminal adapter 124 based on test scripts provided by the test scripts server 120. An exemplary embodiment of the interaction between the CPE 102 and the servers 110-120 is described below.

In general operation, a customer uses the communication device 126 and/or the enhanced terminal adapter 214 to convert content (e.g., voice, video, data, some or all of which may be analog) and signaling into VOIP-based content and signaling ("a VOIP call"). The VOIP call is transmitted to the IP network 108 via the modem 122 over the link 128. Those skilled in the art will appreciate that the VOIP call may pass through other IP networks before reaching the IP network 108 of the VOIP network 104. For example, the VOIP call may pass through various IP networks of the Internet before being routed to the IP network 108 (e.g., internet service provider (ISP) networks, backbone networks, etc.). The proxy server 112 may direct the VOIP call to the appropriate media relay server 114, which in turn forwards the VOIP call to the an endpoint indicated by the VOIP call (e.g., a telephone 132 on the PSTN 106 or another communication device of a VOIP subscriber). Alternatively, the proxy server 112 may direct to the VOIP call to another customer of the VOIP network 104 (e.g., VOIP customer 150).

As VOIP calls are made and received, various call statistics may be generated, such as packets sent, packets received, lost packets, jitter, feedback, round trip delay, and the like. For example, the enhanced terminal adapter 214 may collect end of call statistics over time and periodically transmit the statistics to the call statistics server 118 either upon the initiative of the customer or upon request by the call statistics server 118. Call statistics may also be periodically sent as control messages during a VOIP call (e.g., real time transport control protocol (RTCP) control messages). As discussed above, the call statistics server 118 is configured to collate the various statistics and can generate reports that provide an indication of potential call quality problems. In some embodiments, the call statistics server 118 may automatically identify call quality problems based on the statistics and established threshold values. If a call quality problem is identified, the enhanced terminal adapter 124 obtains test scripts from the test scripts server 120, executes the test scripts (which may involve test calls with the test server 116 and/or test interaction with other network components), and records results of the tests in a log. The log may be analyzed to attempt identification of the cause of the call quality problem.

Figure 2:
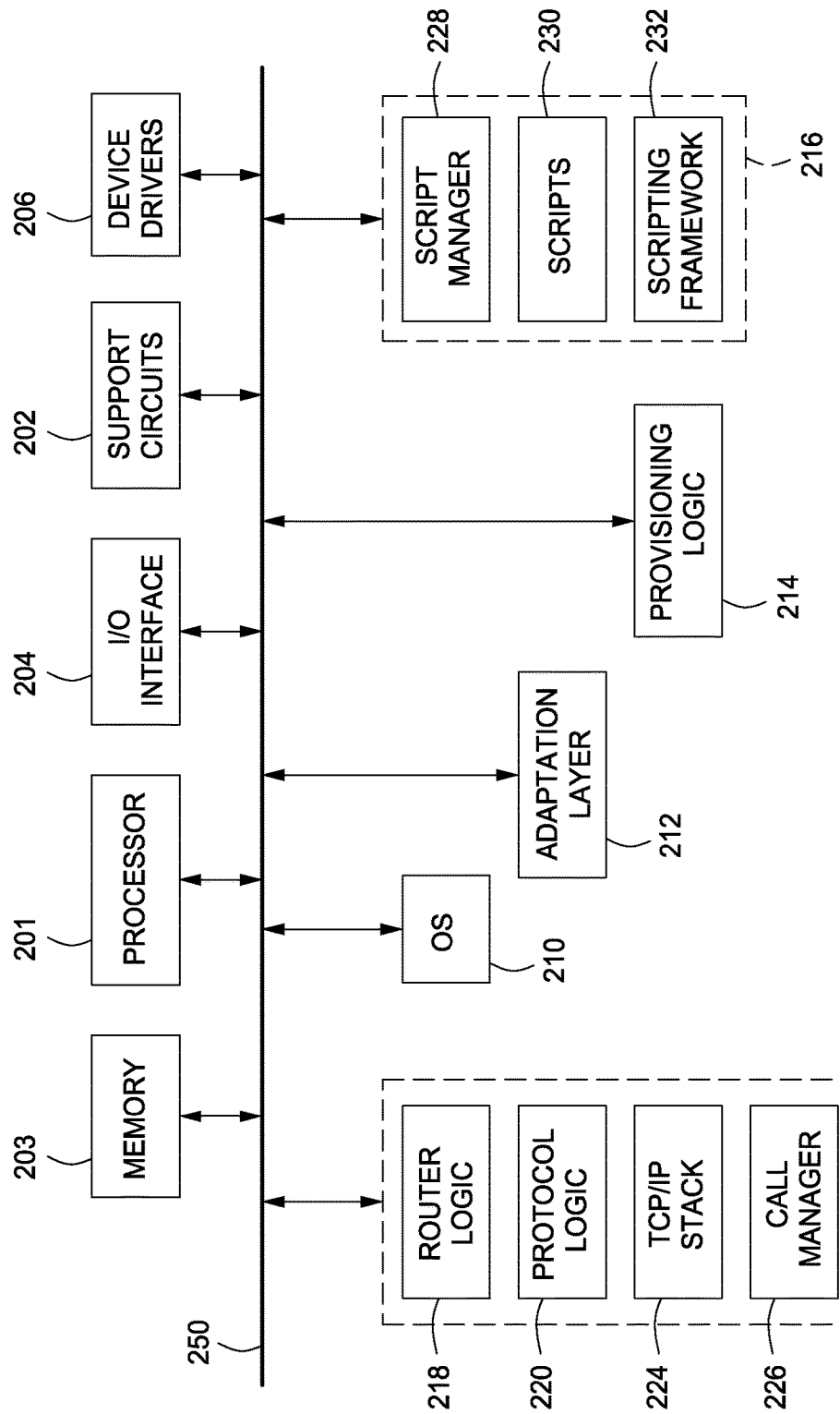
FIG. 2 is a block diagram depicting an exemplary embodiment of the enhanced terminal adapter in accordance with one or more aspects of the invention.

FIG. 2 is a block diagram depicting an exemplary embodiment of the enhanced terminal adapter 124 in accordance with one or more aspects of the invention. The enhanced terminal adapter 124 may include a processor 201, a memory 203, an operating system (OS) 210, various support circuits 204, an I/O interface 202, and a plurality of modules, each of which communicates with a communication link 250. The modules may include device drivers 206, router/terminal adapter functionality 208, an adaptation layer 212, provisioning logic 214, and scripting logic 216. A given "module" may comprise hardware having a particular functionality, e.g., implemented in an application specific integrated circuit (ASIC), field programmable gate array (FPGA), or like type integrated circuit. Alternatively, a module may be implemented in software controlled by the OS 210 and executed by the processor 201. In such embodiments, although shown separately, software modules may be stored in the memory 203 as software code configured for execution by the processor 201. In yet other embodiments, a module may be implemented using a combination of hardware and software, e.g., specific-purpose hardware implemented in an integrated circuit that executes software code.

The processor 201 may include one or more microprocessors, microcontrollers, instruction-set processors, or the like known in the art. The support circuits 204 include conventional cache, power supplies, clock circuits, data registers, and the like. The I/O interface 202 is configured for communication with communication devices (e.g., the communications device 126) and the modem 122. The OS 210 may comprise any well known operating system, such as Windows, Linux, VxWorks, eCos, and the like. The device drivers 206 are configured to provide an interface between the OS 210 and any hardware modules of the enhanced terminal adapter 124. The memory 203 may include one or more of the following random access memory, read only memory, magneto-resistive read/write memory, optical read/write memory, cache memory, magnetic read/write memory, and the like.

The router/terminal adapter functionality 208 comprises a plurality of modules, including router logic 218, protocol logic 220, a TCP/IP stack 224, and a call manager 226. The router logic 218 is configured to provide one or more of router functionality, firewall functionality, network address translation (NAT), functionality, and the like known in the art. The protocol logic 220 is configured to process various protocols used for VOIP calls, such as SIP, real time transport protocol (RTP), real time transport control protocol (RTCP), and the like. The TCP/IP stack 224 is configured to handle TCP/IP communications in the enhanced terminal adapter 124. The call manager 226 is configured to handle incoming and outgoing VOIP calls. The router/terminal adapter functionality and the various modules therein are well known in the art.

The scripting logic 216 comprises a plurality of modules, including a script manager 228, scripts 230, and a scripting framework 232. The scripting framework 232 is script execution environment that can run on various operating systems, including the OS 210. The adaptation layer 212 provides an interface between the scripting framework 232 and other modules in the enhanced terminal adapter 124, such as the TCP/IP stack 224, router logic 218, protocol logic 220, and provisioning logic 214. For example, the scripting framework 232 can use the adaptation layer 212 to expose low-level networking functions to executing scripts. The scripts 230 may be either text-based or binary. Text-based scripts may be converted into a binary form (e.g., byte code) before being executed by the scripting framework 232. Notably, the scripts 230 are not compiled and linked for any particular operating system, including the OS 210. This allows the same script to be executed without re-compilation on any operating system that hosts the scripting framework 232 (e.g., the scripts 230 are independent of the OS 210). The script manager 228 performs the function of downloading scripts (e.g., from the text scripts server) and managing script execution sequences.

The provisioning logic is configured to interface with the provisioning server 110. Notably, the provisioning logic 214 is configured to obtain configuration profiles for the enhanced terminal adapter 124 from the provisioning server 110.

In some specific non-limiting embodiments, the test scripts 230 and the scripting framework 232 are based on Lua, which is a powerful, fast, light-weight, embeddable scripting language that has been designed and implemented by the Pontifical Catholic University of Rio de Janeiro in Brazil. Lua is widely used in a number of embedded applications due to its small size and portable implementation. More information on Lua can be obtained at http://www.lua.org/home.html. While Lua is described as an exemplary scripting language, those skilled in the art will appreciate that any scripting framework can be used with the invention, such as Java, Python, and the like. Therefore, Lua is described herein by way of an example.

The adaptation layer 212 provides advantageous functionality. Notably, the adaptation layer 212 allows test scripts written in Lua (or any other supported scripting language) to interface with the operating system 210, profile logic 220, TCP/IP stack 224, the call manager 226, and/or any other module. The protocol logic 220, TCP/IP stack 224, or other modules may be implemented using the C or C++ programming language, and have C/C++ programming language interfaces. In such case, the Adaptation Layer 212 wraps the existing C/C++ language interfaces exposed by the operating system 210, protocol logic 220, TCP/IP stack 224, or other module into a set of library functions, which are then registered with the scripting framework 232. This provides the ability for the test scripts 230 to call functions of the operating system 210, protocol logic 220, TCP/IP stack, or other module. Similarly, the adaptation layer 212 can also provide callback wrappers that allow events from the operating system 210, protocol logic 220, TCP/IP stack 224, or other module to be sent back to test scripts being executed in the scripting framework 232.

In some embodiments, the adaptation layer 212 is implemented so as to provide a uniform set of function interfaces (also known as an application programming interface or API) to the scripting framework 232. By doing so, the adaptation layer 212 allows multiple different operating systems, protocol logic, networking and telephony stacks, and the like to be exposed to the scripting framework 232 through the same set of functions. This enables the same test script to be run on different embedded enhanced terminal adapter environments, for example an embedded Linux based environment, an eCoS environment, or the like. This provides a significant advantage since the test scripts do not have to be re-written for different implementations of enhanced terminal adapters, which may be based on different operating systems or networking logic.

An exemplary test script is shown in Appendix A, in which a Lua script is used to send internet control message protocol (ICMP) ECHO packets (commonly known as "ping" packets). There are three native C functions exposed by the TCP/IP stack 224 (e.g., SetipAddress, SetNumberOfPings, and PingStart). The adaptation layer 212 includes the necessary wrappers functions in an API (e.g., LuaSetipAddress, LuaSetNumberOfPings, and LuaPingStart), where the wrapper functions allow the Lua script to communicate with the TCP/IP stack 224. The same mechanism can be extended to various other native C/C++ functions exposed by the operating system 210, the protocol logic 220, the TCP/IP stack 224, or other module in order to provide the scripting framework 232 a rich array of low level functions that can be used as building blocks for creating sophisticated test scripts. Since the test scripts run under an interpreter, there is no need to re-compile the test scripts when changes are made. Compilation and firmware upgrade to the enhanced terminal adapter 124 is needed only when the adaptation layer 221 is created and/or modified.

Figure 3:
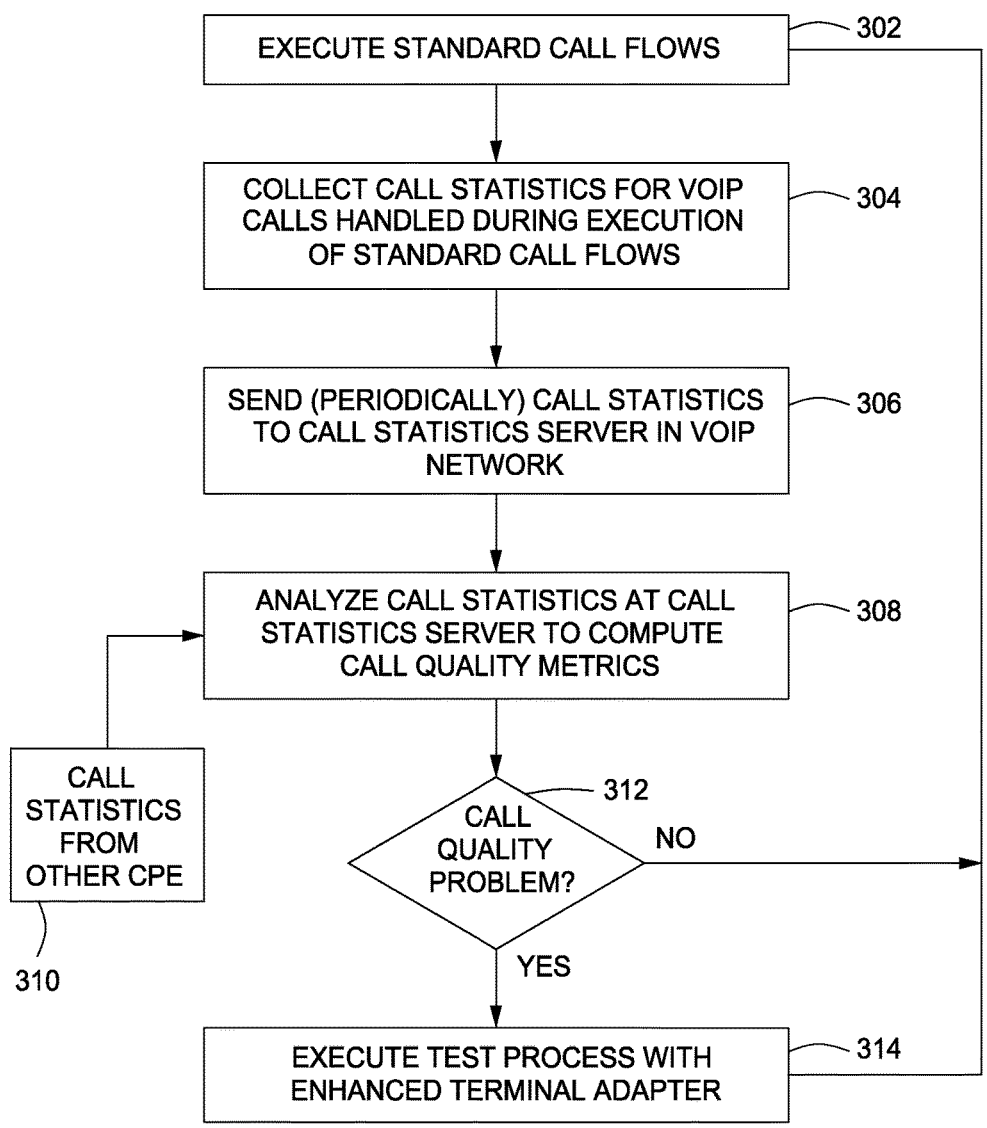
FIG. 3 is a flow diagram depicting an exemplary embodiment of a method for collecting and analyzing call statistics in accordance with one or more aspects of the invention.

FIG. 3 is a flow diagram depicting an exemplary embodiment of a method 300 for collecting and analyzing call statistics in accordance with one or more aspects of the invention. Aspects of the method 300 may be understood with reference to FIGS. 1 and 2. The method 300 begins at step 302, where the enhanced terminal adapter 124 executes standard call flows for VOIP calls made by and received at the CPE 102. The call manager 226 operates normally and the scripting framework 232 is idle, meaning that no scripts are executed.

At step 304, call statistics are collected for VOIP calls handled by the enhanced terminal adapter 124 during execution of the standard call flows. In some embodiments, call statistics may be collected using standard RTCP reporting mechanisms (e.g., via the protocol logic 220). The enhanced terminal adapter 124 may also collect and consolidate call statistics over a particular period of time and/or for a particular number of VOIP calls.

At step 306, the call statistics may be sent to the call statistics server 118 in the VOIP network 104 from the enhanced terminal adapter 124. In some embodiments, the user of the CPE 102 may initiate posting of the call statistics to the call statistics server 118 (e.g., through a user menu selection). Alternatively, the call statistics server 118 may request the call statistics be sent. For example, the call statistics server 118 may send a SIP NOTIFY message to the enhanced terminal adapter 124, when then in turn posts the call statistics to the call statistics server 118. In some embodiments, the enhanced terminal adapter 124 may autonomously post the call statistics to the call statistics server 118 (e.g., using a SIP PUBLISH message). In some embodiments, the call statistics server 118 may send a SIP SUBSCRIBE message to the enhanced terminal adapter 124 to subscribe for call statistics as they become available. In any embodiment, the identity of the call statistics server 118 may be established in the enhanced terminal adapter 124 through a profile downloaded from the provisioning server 110. In still other embodiments, the call statistics server 118 may obtain the call statistics using the standard RTCP reporting mechanisms, as described above. In still other embodiments, the call statistics server 118 may obtain the call statistics using other protocols, such as hypertext transfer protocol (HTTP).

At step 308, the call statistics server 118 analyzes call statistics to computer various quality metrics. Exemplary quality metrics include a mean opinion score (MOS), jitter, and/or latency for a variety of parameters, such as call quality for individual calls for one enhanced terminal adapter plotted over time, call quality for multiple enhanced terminal adapters connected over a particular network plotted over time, call quality for multiple enhanced terminal adapters in a specific geographic area plotted over time, average call quality for the entire VOIP service or some other subset of the VOIP service plotted over time, and the like. The call statistics server 118 may collect call statistics from the enhanced terminal adapter 124, as well as from other CPE (call statistics from other CPE 310).

At step 312, a determination is made whether there is a call quality problem in the VOIP network 104. The call statistics server 118 may automatically detect a call quality problem via its analysis of the call statistics at step 308 (e.g., one or more quality metrics may fail to meet defined threshold(s)). In some cases, the call statistics server 118 may generate reports of the call quality metrics that can be used by a technician to identify quality problems. If there are no quality problems, the method 300 returns to step 302 and repeats. If a call quality problem exists, the method 300 proceeds to step 314, where a test process is executed with an enhanced terminal adapter.

Although the steps of the method 300 are shown sequentially, those skilled in the art will appreciate that various steps may be performed concurrently with other steps. For example, call statistics may be captured by the enhanced terminal adapter 124 at step 304 and sent to the call statistics server 118 at step 306 while the enhanced terminal adapter 124 executes the standard call flows at step 302. The call statistics server 118 may analyze the call statistics at step 308 while steps 302-306 are being performed.

Figure 4:
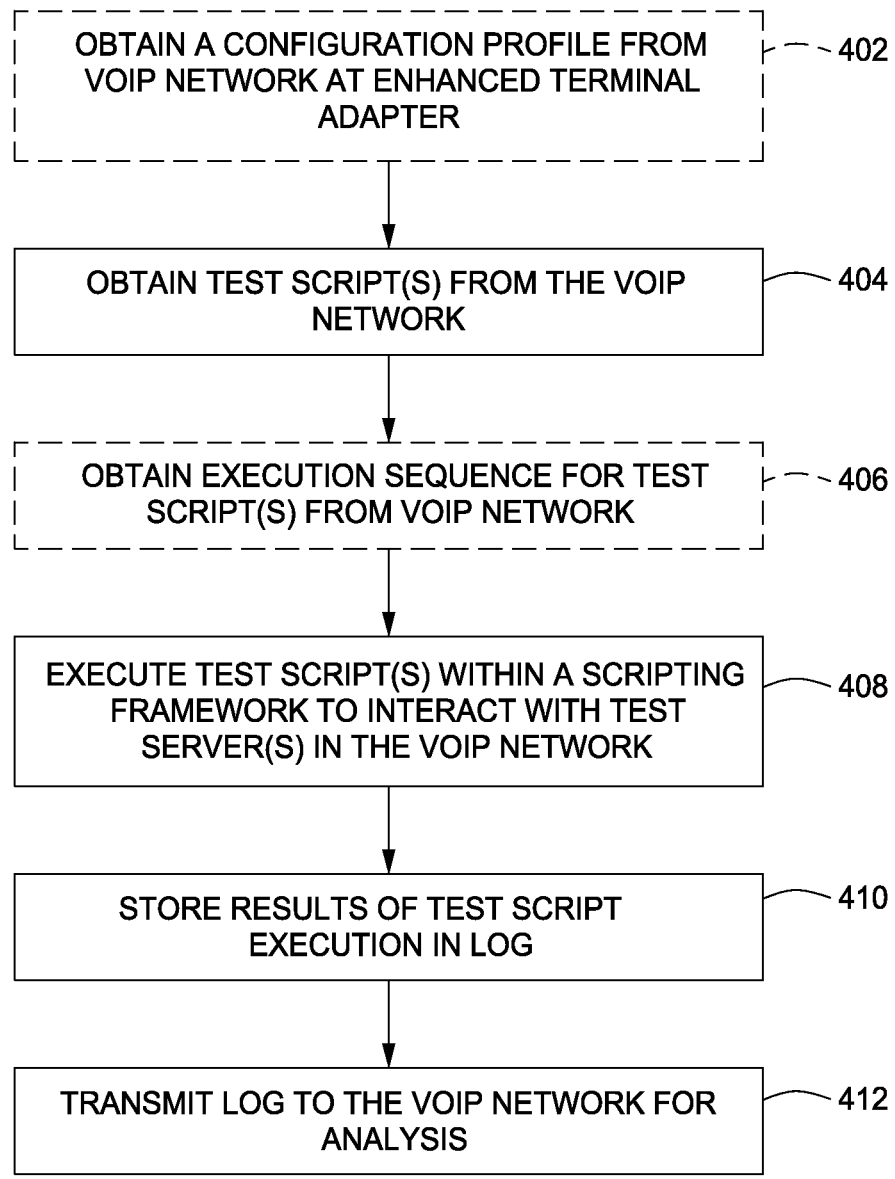
FIG. 4 is a flow diagram depicting an exemplary embodiment of a method for test process execution in an enhanced terminal adapter in accordance with one or more aspects of the invention.

FIG. 4 is a flow diagram depicting an exemplary embodiment of a method 400 for test process execution in an enhanced terminal adapter in accordance with one or more aspects of the invention. The method 400 may be performed during the step 314 of the method 300 in FIG. 3. Aspects of the method 400 may be understood with reference to FIG. 1. The method 400 begins at step 402, where the enhanced terminal adapter 124 can obtain a configuration profile from the VOIP network 104. The configuration profile can include information identifying test script(s) and a test script server from which the test script(s) can be obtained (e.g., test script server 120). At step 404, the enhanced terminal adapter 124 obtains the test script(s) from the VOIP network 104. The enhanced terminal adapter 124 may obtain the test script(s) based on a configuration profile that identifies the script(s) and a server having the script(s).

At step 406, the enhanced terminal adapter 124 can obtain an execution sequence for the test script(s) from the VOIP network 104. At step 408, the enhanced terminal adapter 124 executes the test script(s) within a scripting framework to interact with at least one component in the VOIP network 104. The component(s) may include one or more of test servers, other terminal adapters, other network hosts including other internet hosts, and the like. The test script(s) may be executed based on the execution sequence obtained at step 408. For example, execution of the test scripts may involve making a VOIP call from the enhanced terminal adapter 124 to test server(s)/terminal adapter(s), and/or receiving a VOIP call from test server(s)/terminal adapter(s) at the enhanced terminal adapter 124. Execution of the test scripts may also involve communicating with other hosts, such as pinging an Internet host. In some embodiments, the test script(s) is/are independent of an operating system of the enhanced terminal adapter. As such, the test script(s) can be used on various types of enhanced terminal adapters having various operating systems. During execution at step 408, the scripting framework may call one or more functions of an application programming interface (API) that exposes native functions of the operating system and/or other module(s) in the enhanced terminal adapter 124. The scripting framework may also receive one or more events from the operating system and/or other module(s) using callback wrappers defined by the API. The API enables use of the operating system independent test script(s).

At step 410, results of the execution of the test script(s) is stored in a log. At step 412, the enhanced terminal adapter 124 transmits the log to the VOIP network for analysis.

FIG. 5 is flow diagram showing exemplary embodiment of a method 500 of operation of the enhanced terminal adapter 124 shown in FIG. 2 with the VOIP network 104 shown in FIG. 1 in accordance with one or more aspects of the invention. Aspects of the method 500 may be understood with reference to FIGS. 1 and 2. The method 500 begins at step 512, where a script developer 502 produces a library of test scripts 506 that can be used to troubleshoot various call quality problems. At step 514, the test script library 506 is loaded into the test script server 120. At step 516, a call quality problem detector 504 generates an indication of a call quality problem. The call quality problem detector 504 may be implemented by the call statistics server 118, which can automatically identify problems from the call quality statistics. Alternatively, the call quality problem detector 504 may be a VOIP technician that identifies the call quality problem by analyzing the call statistics, receiving complaints from customers, or the like. In either case, at step

518, the call quality problem detector 504 causes a new configuration profile 508 to be loaded into the provisioning server 110. The configuration profile 508 is configured for the enhanced terminal adapter 124 and identifies the test scripts 506 and the test scripts server 120 as having the test scripts 506 to be used by the enhanced terminal adapter 124 during testing.

At step 520, the call quality problem detector 504 sends a notification to the enhanced terminal adapter 124 that the new configuration profile 508 is available for download. For example, the call quality problem detector 504 may cause a SIP NOTIFY message to be sent. The notification is received by the protocol logic 220 and the TCP/IP stack 224 and forwarded to the provisioning logic 214 at step 522. At step 524, the provisioning logic 214 parses and interprets the notification, and downloads the new configuration profile 508 from the provisioning server 110. In some embodiments, the configuration profile 508 is sent in encrypted form to ensure authenticity of the data. This reduces the risk of downloading a malicious configuration profile. At step 526, the provisioning logic 214 notifies the provisioning server 110 that the configuration profile 508 has been successfully downloaded.

At step 528, the provisioning logic forwards information regarding the descriptions and locations of the test scripts 506 to the script manager 228. At step 530, the Script Manager 228 downloads the test scripts 506 (or an identified portion of the test scripts 506) from the test scripts server 120 (the downloaded scripts are shown as the test scripts 230). In some embodiments, the test scripts 506 (or portion thereof) are sent in encrypted form to ensure authenticity of the data. This reduces the possibility of malicious script loading and execution.

At step 532, the call quality problem detector 504 sends a notification indicating which of the downloaded test scripts 320 are to be executed and in what execution sequence. At step 534, the notification is received by the protocol logic 220 and the TCP/IP stack 224 and forwarded to the provisioning logic 214. At step 536, the provisioning logic 214 parses and interprets the notification and provides the test script execution sequence to the script manager 228. At step 538, the script manager 228 instructs the scripting framework 232 to initiate the execution of the specified test scripts 230 in the specified execution order.

The scripting framework 232 provides the flexibility to execute a variety of functions using test scripts. Examples include: Making test VOIP calls from the enhanced terminal adapter 124 to one or more test servers 116; receiving test VOIP calls from one or more test servers 116; making test calls between one or more enhanced terminal adapters, with or without three-party conferencing; making test calls between multiple enhanced terminal adapters and test servers with or without multiparty conferencing where a test server acts as the conference bridge; making source routed calls to evaluate performance of certain IP routes with respect to other routes; making daisy chained conference calls to evaluate the quality of such multiparty conferencing; making calls at periodic intervals, or at specific times of the day; enabling diagnostic loop back of the incoming media to the sender at either the enhanced terminal adapter(s) or the test server(s); simulating a fax call by sending or receiving a test fax page using a codec, jitter buffer, and/or other media settings configured for fax in the enhanced terminal adapter; simulating a modem call by sending or receiving a test file using a codec, jitter buffer, and/or other media settings configured for modem in the enhanced terminal adapter; simulating in-band and out-of-band dual tone multi-frequency (DTMF) performance with different codes by sending and receiving test DTMF tone strings between the enhanced terminal adapter and a test server; evaluating network conditions such as latency, number of hops, congestion, and the like at different nodes along network paths using tools such as ping, traceroute, and the like; send and receive test packets of different types, for example different codecs, different packetization times, and the like, during test calls to optimize the best fit for a customer's network environment; send and receive non-standard test packets (for example RTP payload encapsulated in TCP) during test calls to evaluate the associated quality and security metrics for network and service improvements; make test calls using different ranges of port numbers for SIP and RTP to check if any configured firewalls could affect the calls; generate typical data application traffic (like HTTP, FTP, etc.) simultaneously with voice or multimedia traffic and capture traffic statistics to analyze the effect of one on the other for a customer's network environment; and/or monitor LAN to WAN traffic patterns passing through the enhanced terminal adapter to determine if any of those could be affecting call quality (e.g., a program running on a computer on the LAN that periodically downloads large files from the Internet could be a factor affecting call quality).

The scripting framework 232 interacts with the protocol logic 220 and the TCP/IP stack 224 (or any other module in the enhanced terminal adapter 124) through the adaptation layer 212. At step 540, the scripting framework may generate logs 510, which are stored in the enhanced terminal adapter 125 (e.g., in the memory 203). The scripting framework 232 then notifies the script manager 228, which in turn notifies the test scripts server 120 and transmits the logs 510 (step 542). A technician can then check the logs 510, interpret the results, and diagnose call quality problems.

Method and apparatus for testing in a communications network is described. In some embodiments, an enhanced terminal adapter for interfacing communication devices and a VOIP network is disclosed having testing functionality that offers a number of advantages over conventional testing techniques, such as use of a separate test probe. Since the test capability is built into the enhanced terminal adapter, there is little or no additional cost, allowing enhanced terminal adapters to be distributed among many customers. The testing techniques described above allow for test script download and execution within seconds, rather than waiting for days for a test probe to be shipped to a customer. This allows immediate troubleshooting of transient network conditions. New custom test scripts can be created by the VOIP service provider at any time, and download near instantaneously into the enhanced terminal adapter, thereby providing maximum flexibility for testing and troubleshooting. There is no interaction or installation required by the customer. Test scripts can be downloaded and executed proactively based on call quality monitoring, and the service can be improved and optimized before the customer complains about call quality. The scripting framework uses the same underlying software modules as the call manager, so the scripting framework simulates and experiences the same conditions as the customer does when making real VOIP calls. This results in far more accurate test results, and thereby much more predictable optimization of the VOIP service. In addition, since the enhanced terminal adapter also provides LAN to WAN connectivity, the test scripts can profile LAN to WAN traffic to determine if they contribute to call quality issues.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

APPENDIX A

APPENDIX A

```
/***************************************************
 * Example Native C Function prototypes for Ping
 ***************************************************/
/* Sets the IP Address to be pinged */
bool SetIpAddress(char* IpAddress);
/* Sets the number of pings to be sent */
bool SetNumberOfPings(unsigned long numberOfPings);
/* Starts the Ping */
bool PingStart(void);
/***************************************************
 * Adaptation Layer Wrapper Functions
 ***************************************************/
#include <stdio.h>
extern "C" {
  #include "lua.h"
  #include "lualib.h"
  #include "lauxlib.h"
}
static int LuaSetIpAddress(lua_State *L)
{
    char* IpAddress[16];
/* Get IP Address string from Lua stack*/
IpAddress = lua_tostring(L, 1);
/* set IP Address */
result = SetIpAddress(IpAddress);
lua_pushboolean(L, result);
return 1;
}
static int LuaSetNumberOfPings(lua_State *L)
{
  bool result;
    /* get number of pings */
    numberOfPings = lua_tonumber(L, 1);
    /* set number of pings */
    result = SetNumberOfPings(numberOfPings);
    lua_pushboolean(L, result);
    return 1;
}
static int LuaPingStart(lua_State *L)
{
  bool result;
    /* set number of pings */
    result = PingStart( );
    lua_pushboolean(L, result);
    return 1;
}
/***************************************************
 * Register the Adaptation Layer wrapper functions
 * with the Lua Interpreter
 ***************************************************/
    lua_register(L, "LuaSetIpAddress", LuaSetIpAddress);
    lua_register(L, "LuaSetNumberOfPings", LuaSetNumberOfPings);
    lua_register(L, "LuaPingStart", LuaPingStart);
/***************************************************
 * Finally, we can write a Lua script that calls the
 * Adaptation Layer wrapper functions to send 3 pings
 ***************************************************/
-- Lua script to send 3 ping packets
print("Setting IP Address to 192.168.15.2")
r = LuaSetIpAddress("192.168.15.2")
if r == false then
   print("Error setting IP address")
print("Setting Number of Pings to 3")
r = LuaSetNumberOfPings(3)
if r == false then
   print("Error setting number of pings")
print("Sending pings")
r = LuaPingStart( )
```

APPENDIX A-continued

```
if r == false then
   print("Error sending pings")
-- End of Lua script
```

What is claimed is:

1. A method of testing in a voice over internet protocol (VOIP) network, comprising:
   collecting call statistics at an enhanced VOIP terminal adapter during execution of standard call flows, the enhanced VOIP terminal adapter being configured to couple at least one communication device to the VOIP network, receive and place calls, and obtain configuration profiles from a provisioning server;
   analyzing the call statistics to identify call quality problems;
   obtaining at least one test script from the VOIP network at the enhanced VOIP terminal adapter based on the identified call quality problems;
   executing the at least one test script within a scripting framework of the enhanced VOIP terminal adapter to interact with at least one component coupled to the VOIP network; and
   transmitting results of the execution of the at least one test script from the enhanced VOIP terminal adapter to the VOIP network.

2. The method of claim 1, further comprising:
   obtaining a configuration profile at the enhanced VOIP terminal adapter from the VOIP network, the configuration profile including information identifying the at least one test script and a test script server from which the at least one test script can be obtained.

3. The method of claim 1, further comprising:
   obtaining an execution sequence for the at least one test script at the enhanced VOIP terminal adapter from the VOIP network;
   where the at least one test script is executed based on the execution sequence.

4. The method of claim 1, wherein the step of executing the at least one test script comprises at least one of:
   making a VOIP call from the enhanced VOIP terminal adapter to the at least one component;
   receiving a VOIP call from the at least one component at the enhanced terminal adapter; or
   attempting communication between the enhanced VOIP terminal adapter and the at least one component.

5. The method of claim 1, wherein each of the at least one test script is independent of an operating system of the enhanced terminal adapter.

6. The method of claim 5, wherein the step of executing the at least one test script comprises:
   calling at least one function of an application programming interface (API) from the scripting framework, the API exposing native functions of the operating system, at least one module in the enhanced terminal adapter, or both the operating system and the at least one module; and
   receiving at least one event at the scripting framework from the operating system, the at least one module, or both the operating system and the at least one module using callback wrappers defined by the API.

7. The method of claim 1, wherein the act of analyzing the call statistics to identify call quality problems further includes computing call quality metrics based on the analyzed call statistics; and identifying a call quality problem based on the call quality metrics.

8. An enhanced voice over internet protocol (VOIP) terminal adapter for coupling at least one communication device to a voice over internet protocol (VOIP) network, comprising:
   terminal adapter and routing logic configured to make and receive VOIP calls;
   a test script manager configured to obtain at least one test script from the VOIP network based on one or more identified call quality problems during execution of standard call flows executed by the terminal adapter; and
   a scripting framework module configured to execute the at least one test script to interact with at least one component coupled to the VOIP network and transmit results of the execution of the at least one test script to the VOIP network.

9. The enhanced VOIP terminal adapter of claim 8, further comprising:
   provisioning logic configured to obtain a configuration profile from the VOIP network, the configuration profile including information identifying the at least one test script and a test script server from which the at least one test script can be obtained.

10. The enhanced VOIP terminal adapter of claim 8, wherein the test script manager is configured to obtain an execution sequence for the at least one test script from the VOIP network, and wherein the scripting framework module is configured to execute the at least one test script based on the execution sequence.

11. The enhanced VOIP terminal adapter of claim 8, wherein the scripting framework module is configured to at least one of:
   make a VOIP call to the at least one component;
   receive a VOIP call from the at least one component; or
   attempt communication with the at least one component.

12. The enhanced VOIP terminal adapter of claim 8, further comprising:
   a processor; and
   a memory having an operating system executed by the processor;
   wherein each of the at least one test script is independent of the operating system.

13. The enhanced VOIP terminal adapter of claim 12, further comprising:
   at least one module; and
   an adaptation layer having an application programming interface (API), the API exposing native functions of the operating system, the at least one module, or both the operating system and the at least one module, the API defining callback wrappers for receiving events from the operating system, the at least one module, or both the operating system and the at least one module;
   wherein the scripting framework is configured to call at least one function of the API and receive at least one event using the callback wrappers.

14. The enhanced VOIP terminal adapter of claim 8, further comprising:
   statistic capture logic configured to collect call statistics during execution of standard call flows by the terminal adapter and routing module, and send the call statistics to the VOIP network.

15. Apparatus for testing in a voice over internet protocol (VOIP) network, comprising:
   a) at least one processor; and
   b) at least one storage device storing processor-executable instructions which, when executed by the at least one processor, perform a method including
      collecting call statistics at an enhanced VOIP terminal adapter during execution of standard call flows, the enhanced VOIP terminal adapter being configured to couple at least one communication device to the VOIP network, receive and place calls, and obtain configuration profiles from a provisioning server;
      analyzing the call statistics to identify call quality problems;
      obtaining at least one test script from the VOIP network at the enhanced terminal adapter based on one or more identified call quality problems during execution of standard call flows executed by the terminal adapter;
      executing the at least one test script within a scripting framework of the enhanced VOIP terminal adapter to interact with at least one component coupled to the VOIP network; and
      transmitting results of the execution of the at least one test script from the enhanced VOIP terminal adapter to the VOIP network.

16. The apparatus of claim 15, wherein the method further includes obtaining a configuration profile at the enhanced VOIP terminal adapter from the VOIP network, the configuration profile including information identifying the at least one test script and a test script server from which the at least one test script can be obtained.

17. The apparatus of claim 15, wherein the method further includes obtaining an execution sequence for the at least one test script at the enhanced VOIP terminal adapter from the VOIP network; and
   where the at least one test script is executed based on the execution sequence.

18. The apparatus of claim 15, wherein each of the at least one test script is independent of an operating system of the enhanced terminal adapter.

* * * * *